F. DUBROW.

ARTIFICIAL FISH BAIT.

APPLICATION FILED APR. 14, 1920.

Reissued Oct. 11, 1921. 15,204.

INVENTOR
F. DUBROW

BY Wright & Clemm

ATTYS.

UNITED STATES PATENT OFFICE.

FREDERICK DUBROW, OF SAUSALITO, CALIFORNIA.

ARTIFICIAL FISH-BAIT.

15,204. Specification of Reissued Letters Patent. Reissued Oct. 11, 1921.

Original No. 1,334,022, dated March 16, 1920, Serial No. 192,054, filed September 19, 1917. Application for reissue filed April 14, 1920. Serial No. 373,926.

*To all whom it may concern:*

Be it known that I, FREDERICK DUBROW, a citizen of the United States, residing at Sausalito, in the county of Marin and State of California, have invented new and useful Improvements in Artificial Fish-Bait, of which the following is a specification.

The object of the present invention is to provide an artificial fish bait or spoon which will be of great efficiency in catching fish, and which can be readily adjusted to hold hooks of different sizes, and to catch different kinds of fish.

Figure 1:
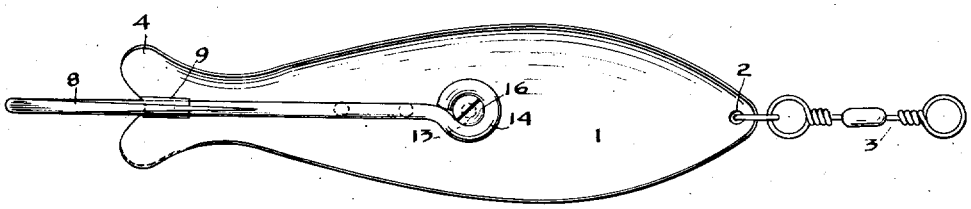
Figure 2:
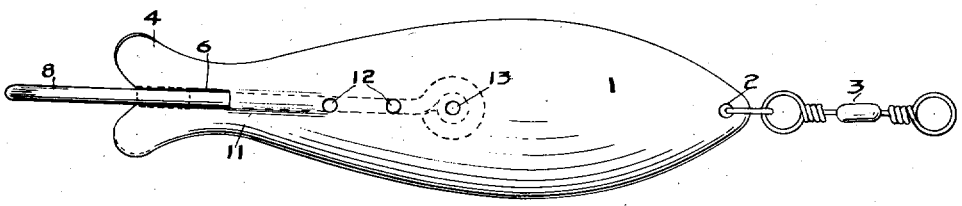
Figure 3:
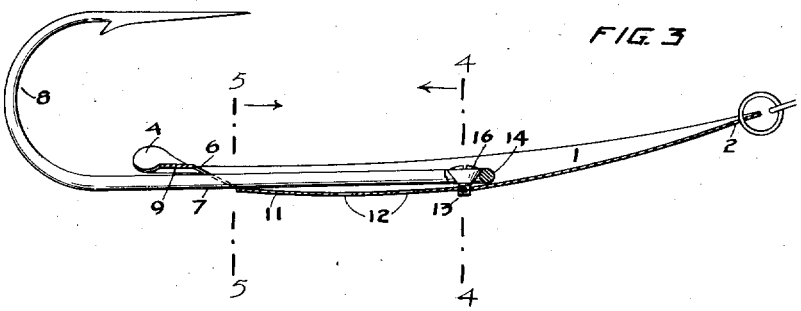
Figure 4:
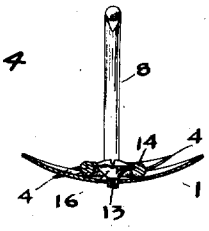
Figure 5:
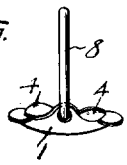

In the accompanying drawing, Figure 1 is a side view of the device looking at its inner side; Fig. 2 is a similar view looking at its outer side; Fig. 3 is a longitudinal, central section thereof; Fig. 4 is a cross section on the line 4—4 of Fig. 3, and Fig. 5 is a cross section on line 5—5 of Fig. 4.

Referring to the drawings, 1 indicates the main body of the spoon, which, in general form, somewhat resembles a greatly elongated bowl of an ordinary spoon, having a considerable curvature in cross section and a slight curvature in longitudinal section. The front end or nose of the spoon is apertured, as shown at 2, to permit the attachment thereto of a common swiveling connection 3, which can also be connected to a fishing line. The spoon diminishes in width to the rear, and then at the extreme end is extended in width sharply, as shown at 4, on each side, forming a tail, said extended portions being spiral in form and resembling propeller blades. By reason of these propeller-shaped extensions, the spoon is given a rotary motion as it is drawn through the water or as the current of water flows past it, thereby imparting to the spoon the appearance of a small live fish.

In the center of the narrowest portion of the spoon there is formed a longitudinally extending slot 6, of sufficient width only to receive therethrough the shank 7 of a hook 8, and the spoon is grooved in its outer side to the rear of said slot, as shown at 9, and on its inner side to the front of said slot, as shown at 11, and in its axial line immediately in front of said groove 11 the spoon is formed with a longitudinal series of holes 12, all of said holes being of such size as to receive a screw 13.

To attach a hook to said spoon, the pointed end of the hook is first passed through said slot 6, and the shank of the hook is placed close to the concave side of the spoon with the usual loop 14 already provided at the end of the shank around one of the holes 12 in the spoon. The screw 13 is then screwed into said hole until its head 16 abuts against said loop 14, when the hook is held tight in position on the spoon. For different sizes of hooks, different holes 12 will be used.

I am aware that it is not new to form a metallic bait of the contour resembling that of the body of a fish and having a propeller-shaped tail, but heretofore, so far as I am aware, such artificial bait has been flat, and the effect of drawing such a flat body having a propeller-shaped tail through the water has been to give it a simple helical motion about its longitudinal axis.

But I have found that the result of drawing through the water, a concavo-convex sheet metal body having a propeller-shaped tail such as that shown herein is to cause the entire body of the spoon to travel in a helical path, that is, to have a revoluble as well as a longitudinal motion. The diameter of the helical path traveled by a spoon of the size shown in the drawing is about eight inches. This revoluble motion of the artificial bait about an axis outside its body, as distinguished from a rotary motion about the axis of the spoon, greatly increases its effectiveness.

I claim:

In a device of the character described, the combination of a concavo-convex elongated plate having a tapering front end and a rear portion tapering to the rear and then extended in width sharply on both sides, each extension having a spiral form to form a propeller, said plate having an elongated slot extending centrally of its narrow portion and grooved in its outer surface to the rear of said slot and having a longitudinal series of holes therethrough in front of said last-named groove, a hook having a shank in both of said grooves and extending through said slot and having a loop adjacent to one of said holes, and a screw extending through said loop and hole and having a head pressed against said loop.

FREDERICK DUBROW.